US011861821B2

(12) United States Patent
Kaner

(10) Patent No.: US 11,861,821 B2
(45) Date of Patent: Jan. 2, 2024

(54) SYSTEM FOR MEASURING OBJECTS IN TALLY OPERATIONS USING COMPUTER VISION OBJECT DETECTION METHODOLOGIES

(71) Applicant: Kuter Kaner, Atlanta, GA (US)

(72) Inventor: Kuter Kaner, Atlanta, GA (US)

( * ) Notice: Subject to any disclaimer, the term of this patent is extended or adjusted under 35 U.S.C. 154(b) by 0 days.

(21) Appl. No.: 17/445,309

(22) Filed: Aug. 17, 2021

(65) Prior Publication Data

US 2022/0058792 A1 Feb. 24, 2022

(51) Int. Cl.
| | |
|---|---|
| *G06K 9/00* | (2022.01) |
| *G06T 7/00* | (2017.01) |
| *G06T 7/62* | (2017.01) |
| *G06V 10/94* | (2022.01) |

(52) U.S. Cl.
CPC ............ *G06T 7/0006* (2013.01); *G06T 7/62* (2017.01); *G06V 10/95* (2022.01); *G06T 2207/30161* (2013.01); *G06T 2207/30242* (2013.01)

(58) Field of Classification Search
CPC ..................... G06T 7/0006; G06T 7/62; G06T 2207/30161; G06T 2207/30242; G06T 2207/20084; G06T 7/0004; G06V 10/95; G06V 10/82; G06V 20/10
See application file for complete search history.

(56) References Cited

U.S. PATENT DOCUMENTS

| | | | |
|---|---|---|---|
| 5,960,413 A * | 9/1999 | Amon ................. | G06Q 10/087 342/464 |
| 8,960,244 B1* | 2/2015 | Aylsworth ............ | B65G 59/02 144/245.5 |
| 10,580,126 B1* | 3/2020 | Weinschenk ............ | G06T 7/001 |
| 11,222,419 B1* | 1/2022 | Bolton ...................... | G06T 7/90 |
| 2017/0057113 A1* | 3/2017 | Aylsworth ............. | B27B 31/04 |
| 2020/0193561 A1* | 6/2020 | Leordeanu ............. | G06V 10/82 |
| 2020/0327653 A1* | 10/2020 | Leordeanu .............. | G06T 7/001 |
| 2022/0148152 A1* | 5/2022 | Hyatt .................... | G06T 7/0004 |
| 2022/0236176 A1* | 7/2022 | Bolton ............... | G01N 21/8986 |

FOREIGN PATENT DOCUMENTS

WO     WO-2008057504 A2 *    5/2008    ............ G08C 21/00

* cited by examiner

*Primary Examiner* — Shervin K Nakhjavan

(57) ABSTRACT

Stock management for wood and lumber products requires measuring and counting items individually on a continuous basis; considering a single lumber package alone can contain hundreds of pieces, it is a tedious task that is error prone when done manually. The invention provides a technology solution that involves taking a picture of products using a smart-phone, or a tablet's built-in camera, processing said picture data to detect individual items using Artificial Intelligence Object Detection methods, and utilizing special algorithms to measure and compute unit volume to present the user a detailed description, measure, count, and a summary. This process helps identify and take stock counts faster and with higher accuracy.

17 Claims, 3 Drawing Sheets

SYSTEM FOR MEASURING OBJECTS IN TALLY OPERATIONS USING COMPUTER VISION OBJECT DETECTION METHODOLOGIES

CROSS-REFERENCE TO RELATED APPLICATIONS

This application claims the benefit of Provisional Application No. 62/706,466, filed on August 18, 2020.

BACKGROUND OF INVENTION

In the wood products and lumber industries, stock management is a major challenge because measurements of product dimensions must be taken, scored, and tracked on a continuous basis. Detailed information is required to be maintained timely as products move in and out of stock. Conventional record keeping cannot keep up at the same rate as the business activities occur, causing delays, errors, and loss of data integrity.

Taking measurements of products individually, computing unit volume, and counting inventory, for wood products or other similar materials with length, width, thickness dimensions, is a complex, tedious, and time-consuming task. In addition to keeping track of physical measurements, it is also necessary to classify products in order to manage stock effectively.

Applicant's previously patented system Sierra DigiTally (U.S. Pat. No. 7,431,212) solves these challenges by introducing a bar-coded ruler that helps operators scan width, length, thickness quickly, saving all data on a mobile computer for processing. While providing a major improvement in capturing product data through its commercial use, the Sierra DigiTally system requires taking measurements of each piece of product individually. The present invention accomplishes the same task by taking a single picture of the product and evaluating its contents for measurements of all the pieces at once.

Currently, there are other methods that also offer the ability to take measurements; such methods range from manually measuring and scoring on paper, to capturing and detecting measurements by special detection equipment.

The objective of the invention referred herein as "SnapTally" is to simplify and improve the process of taking measurements, counting, and identifying products.

SUMMARY OF INVENTION

In measuring dimensions of lumber, and similar materials with three dimensions, generally one can use a measuring tape to take physical readings; the present invention utilizes Artificial Intelligence computer vision object detection methodologies to measure and count products in a picture that contains such objects.

It is an object of the present invention, SnapTally, to detect objects within a given package, count and measure each object, identify and classify products, make data-collections available for further processing; such objects consisting particularly of lumber as well as similar three-dimensional products. The invention comprises of a software system that runs on smart phones, tablets, or other mobile devices to snap a picture of the lumber pack, or other products being measured. The image is processed by object recognition algorithms to automatically identify each object apparent in the image. Evaluation procedures apply formulas based on the image pixels with respect to the actual unit ratios to calculate the measurement of each object without requiring any external apparatus. The system also counts the number of objects, and computes the total volume based on the total number of objects and their measurements.

SnapTally system provides the ability to change settings to fine tune the detection process based on user requirements and the environment in which it's being used. There are supporting functionalities within the system that help manage images, classify the products, edit records, and manually draw bounding-boxes for measuring if necessary. Once the products have been identified and measured, their data is saved on the local device, and/or transmitted to a cloud database for further processing and management.

In comparison to other similar methods that may use image recognition for measurement, the advantage of SnapTally system is that it does not require an apparatus in front of the object in order to take measurements. A special construction and/or a picture-booth are also not needed, furthermore, the bundle is not required to be moved to any special area; SnapTally system only requires the use of a smart phone, tablet, or another mobile device with a high definition camera that can take images, and an internet connection for data transmittal and further processing.

SnapTally system provides a practical solution for measuring and counting objects using mobile devices with cameras, software application, and artificial intelligence and object recognition technologies.

The SnapTally invention is new and original because it offers the following features:
 Operator can take a picture of a product and measure the objects within the picture,
 The objects can be measured, counted, identified, and volume computations can be made,
 A mobile device with a camera, such as a smart phone or a tablet runs the SnapTally application
 Data for the objects are stored and managed on device, and data is uploaded to a Stock manager application as well
 Labels with or without barcodes may be printed from mobile device to a compatible printer
 No additional apparatus or equipment is needed in order to detect and measure objects

BRIEF DESCRIPTION OF DRAWINGS

The present invention is described in more detail, reference being made to the accompanying drawings, in which FIG. 1. Illustrates the components of the invention; a device to snap a picture and a typical lumber pack.

DETAILED DESCRIPTION

Figure 1:
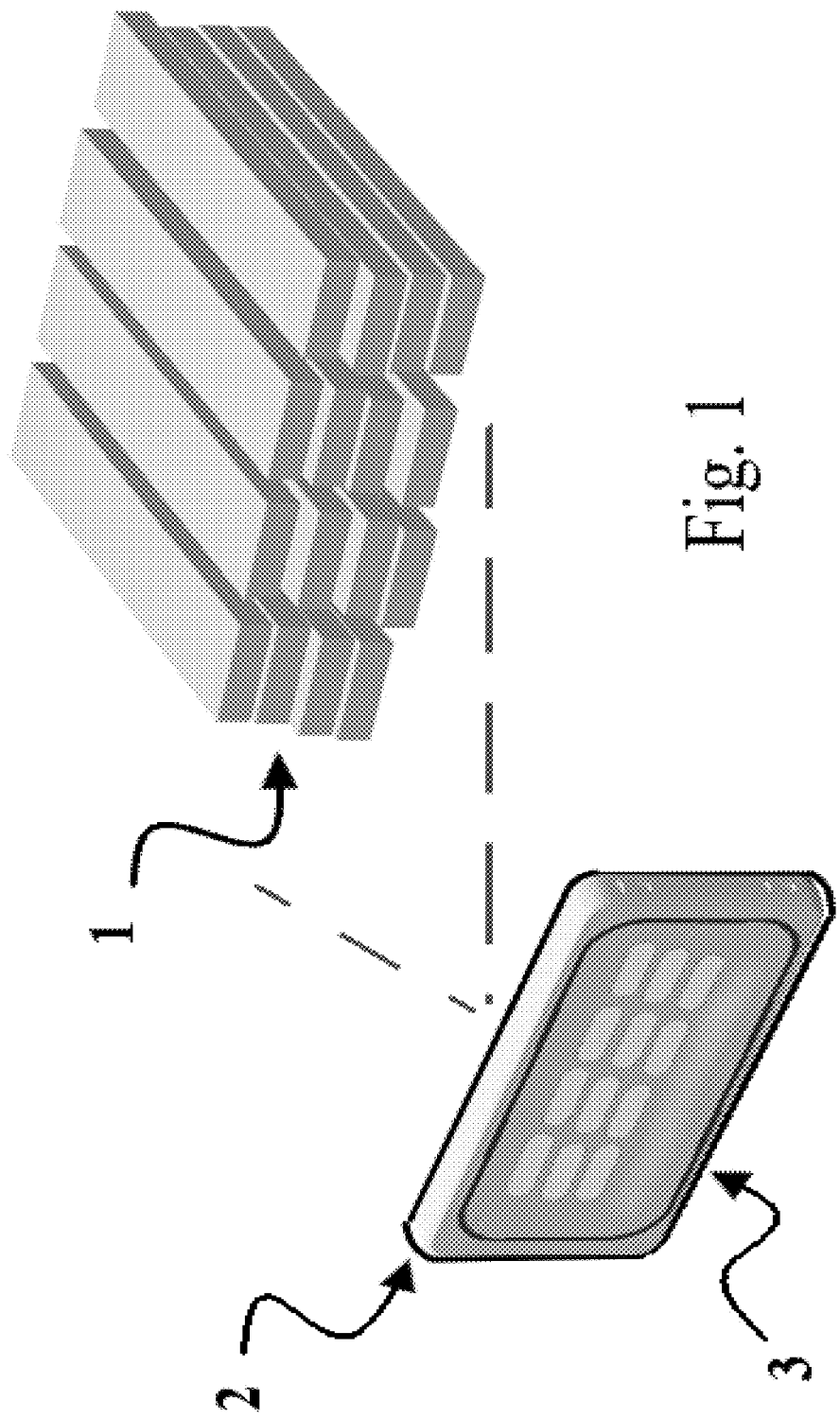

FIG. 1. Outlines general components of the invention and the basic process. Facing the front of the lumber pack 1 user prepares to take a picture of the bundle to be measured. Using his/her smart phone, tablet, or other mobile device with a built-in camera 2, user snaps a picture of the bundle from the SnapTally application running on the device. If the picture is satisfactory, user confirms and the picture is saved for the detection process. Next, user initiates the "Detect" function in the application against the picture taken. The detection process initiates algorithms based on the artificial intelligence models trained for identifying individual objects, and detected items are displayed within bounding-boxes on the screen 3.

Figure 2:
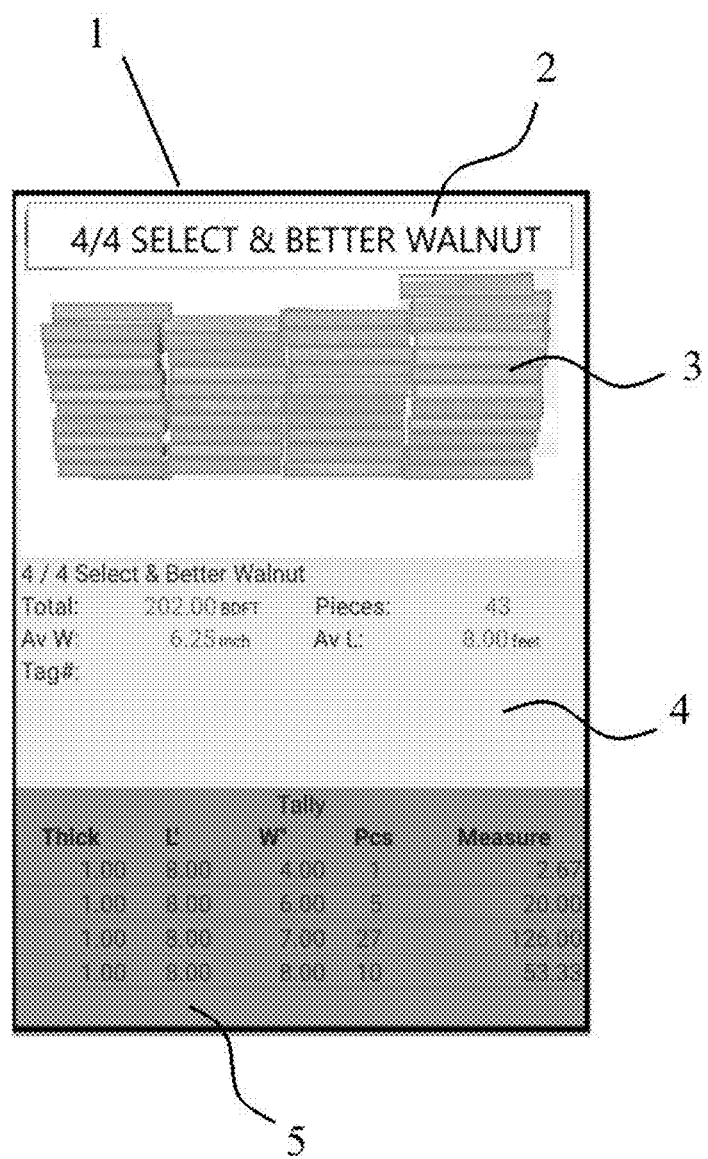
FIG. 2. is the application screen where the detected objects have bounding boxes drawn around each item, and the additional product details are displayed.
Figure 3:
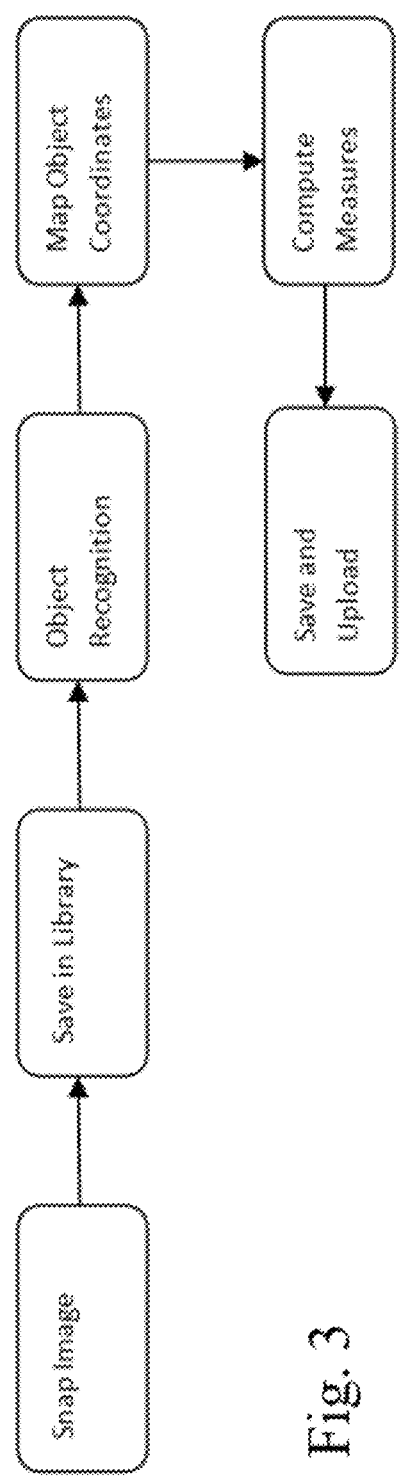
FIG. 3. Illustrates high-level diagram of the process flow

FIG. 2. Illustrates the application screen 1 upon completion of detection process, containing the description of the product 2 (entered by user), all the detected items having bounding boxes drawn around them 3. User may inspect and further edit, add, or remove boxes if necessary. User initiates the "Product" function to specify the type of product, its quality, and any other details related to this work. He/she then proceeds to run the actual measurement of the detections with the "Measure" function. In measuring each item, the pixels in the image are evaluated, and based on the boxes drawn around each object, the actual measurement value is computed and assigned to each of the pieces. The application displays product information and summary data resulting from the identification and measurement of the bundle 4. All the tally details are shown with thickness, length, width, number of pieces, and volume 5.

The application finally computes all the individual volumes, and a summary of the lumber bundle. This data is saved on the device, and can be managed, edited, re-detected later if necessary. Captured data can be uploaded, transmitted to a server system for further processing.

It should be emphasized that the term "comprises/comprising" when used in this specification is taken to specify the presence of stated features, steps or components but does not preclude the presence or addition of one or more other features, steps, components or groups thereof.

Description of the Invention

The foregoing disclosure and the claims describe the preferred embodiments of the present invention. Particularly with respect to the claims, it should be understood that changes may be made without departing from its essence. In this regard, it's intended that such changes would still fall within the scope of the present invention which may be accomplished. To the extent such revisions utilize the essence of the present invention, each naturally fall within the breadth of protection encompassed by this patent.

The present invention SnapTally addresses the need to take measurements of products quickly and accurately. The system utilizes a high-definition camera to capture the image of the object; it processes the image, and produces data related to the measurements and counts within the image. Main objective is to provide measurement and count data of objects in the real-world by simply taking pictures.

Benefits

While a manual measuring operation is the most inefficient method, and other alternative solutions require apparatus and equipment that may not be practical to install, as well as being costly, the SnapTally invention can be employed by anyone with a smart phone, tablet, or another mobile device with a camera; it's practical to deploy and it produces results quickly.

Architecture and Methods

The SnapTally system is based on two major components; mobile device with a camera and SnapTally application. The application runs on smart phones, tablets, and other devices with Android operating systems; however other operating systems can also be available. A built-in camera, or an external camera, is required to snap pictures, and network connectivity enables data transmission and processing.

General Specifications

Hardware and Equipment: Smartphone, Tablet, Rugged Handheld Device, or Mobile Device Built-in or External Camera Wi-Fi and/or GSM Operating System: Android Mobile Software: Sierra SnapTally to detect, measure, and manage related data Process The SnapTally mobile software captures an object's image using device's built-in camera, and saves the image on the device; a built-in flash or an external flash, as well as an external camera, can be used to aid in improving image quality.

The object being measured is a package of lumber boards. The system recognizes and marks each individual board within the pack and measures its width. The lumber package for measurement is shown in FIG. 1.

The picture is snapped from the front end of the package of lumber, the face showing the widths of the boards are to be measured. The image is then submitted to be processed, either on the mobile device, or on a server running a model of a Machine Learning Library with neural networking and algorithms used in identifying pieces of objects contained in the picture. The model resolves each object and returns the data related to the detection performed. The image is displayed for the operator with all the object representations drawn as boxes around each piece. (See FIG. 2)

The user supplies primary data to convert and compute image information to actual measurement data; the system uses such data to compute product total volume and count. In most applications the length data for a package is a fixed value, and thickness is part of the product identification specified by user. FIG. 2 sections 4 and 5 show all measurements of individual pieces and totals displayed on the screen. The operator may also add or edit objects manually as required, enter product information, save and/or transfer the data for continued processing.

Comparison to Other Inventions

U.S. Pat. No. 5,307,294 "Automated End Tally System" is designed to perform the task of measuring lumber boards. This system requires a sophisticated mechanical and electronic equipment to be installed. In comparison, the present invention requires no such costly installations; the only equipment used primarily is a hand held device with a camera and the software for detections. The prior art also requires lifting and moving heavy bundles of lumber whereas the present invention performs all measuring on location without moving the objects.

U.S. Pat. No. 7,431,212 "Practical mobile data collection and processing system with bar-coded tally ruler" is another invention that measures and counts products. The system uses a bar-coded ruler to scan each individual piece whereas the present invention performs the measuring by detecting all the objects at once.

Development

The mobile application that drives the process of detection and management of data is built for the Android® platform, and Java language has been used to develop the system. The application utilizes a local database management system SQLite to store and manage data related to the application. The application is easily portable to other platforms such as Apple iPhone®. On the server platform, a Machine Learning library model that has been specifically trained to process object detection is configured to service the mobile application. The server accepts images from the mobile application and provides coordinates of objects upon detection. A compact version of the Machine Learning model is also available to process images without the server.

Object Detection

One of the components of the invention is the object detection process to identify the items in the image presented. The methods utilized are explained in the following sections:

Training a Custom Object Detection Model

An Object Detection Model is part of an Artificial Intelligence system that includes a deep-learning network. The model must be trained to detect specific types of objects. A custom model is generally based on a framework of available models that are further trained and/or customized.

Tensorflow is a well known and utilized open source platform with libraries and tools for machine learning that is provided by Google. Libraries contain various object detection models, as well as other features such as speech. Tensorflow is available for download from an open source platform.

Among various object detection models available for implementation, the invention utilizes a specific model as described below:

Faster_RCNN: Faster Regional Convolutional Neural Network. This base model performs better for object detection of smaller objects.

Using this model does not limit the invention's technical architecture from using other models, combination of different models, or other computer vision technologies now or in the future. The Faster RCNN model is the current technology utilized in object detections at the time of the filing of the patent.

1. In order to train an object detection model, one must first annotate the objects being presented for training. This is one of the most painstaking and important tasks in object detection, and a key component of the invention. Present invention contains a large collection of images taken on location at actual customer/user sites. Each individual object in the image is then annotated, a box drawn around it to identify it. A single image contains hundreds of objects, the training collection consists of thousands of images, both original and augmented, for performance improvements.

Once the annotations are completed the actual machine learning process starts. The data is presented to machines and software designed for learning about the data; this process involves testing, modifying parameters for improvements, presenting additional data, and training on multiple cycles until valid results are obtained. Fine tuning for a specific application, such as intended in the present invention, can take months and years. Therefore, while object detection has been a popular catch phrase and utilized in many different practical applications, in the present invention it represents a focused solution, and requires a highly specialized concentration, algorithms, effort, and know-how to provide a particular industrial application.

Serving the Model for Inference

Once satisfactory results are obtained from training and testing, a trained model is generated to serve and produce consistent detection of objects for the application. In the present invention, SnapTally, such a model is presented images and returns all of the objects contained within a particular image with coordinates. The platform of the service can vary depending on the desired objectives and configuration; this service can also run on a mobile device.

Summary and Status

SnapTally system is continually being improved, additional capabilities and features may be added, existing algorithms may be optimized through developed versions of the solution. However, the objective of the invention and the method of producing real-world measurements from images remain the same, detecting all of the pieces and measuring them accurately. Major features included are, capturing images via camera, Object Detection, Measure and Compute, Data Management, Editing and Adding Objects, Uploading to Cloud, Label Printing.

CONCLUSION

Ability to measure, count, and manage product information, particularly for wood and lumber inventories present a unique challenge. A fast and accurate method is required to keep up with business demands as products are continually on the move. The SnapTally invention is unique and offers new methods by simply snapping a picture of a product to detect and measure objects within the image; in comparison to other image based detection systems, SnapTally does not require a special apparatus or equipment. The system works with smart phones, tablets, and other devices with built-in cameras. SnapTally empowers users and managers, brings an effective solution to the problem of measuring and counting inventories.

What is claimed is:

1. A system for counting and measuring of stacked and bundled three-dimensional objects, the system comprising:
    a mobile device comprising:
        a built-in or a connected camera configured to capture an image of the frontal plane of stacked objects with their widths exposed and in direct view of the camera;
        a processor to:
            automatically, using neural networks for object detection and at least one object recognition algorithm, apply a plurality of bounding-boxes to the captured image from the camera, wherein each of the plurality of bounding-boxes represents one or more detected objects in the captured image;
            calculate, based on the pixels of each detected object and the pixels relationship with respect to an actual unit ratio, the dimensions of each of the detected objects in imperial or metric units; and
            count the number of stacked objects, and compute a total volume based at least in part on the number of stacked objects and the calculated dimensions of the detected objects.

2. The system of claim 1, wherein the object recognition algorithm comprises one or more object detection models, and wherein each of the detection models is trained to detect specific types of objects.

3. The system of claim 2, wherein the one or more object detection models having been produced by supplying specific sample images of objects, by annotating and classifying the individual objects through at least one supervised object detection learning process.

4. The system of claim 3, wherein the supervised object detection learning process comprising:
    manually drawing of boxes around each object in the originally captured and augmented images, and classifying each object; and
    redrawing boxes around each object, when correction and iteration is required to obtain well-defined bounding boxes.

5. The system of claim 2, wherein the object detection model is part of an artificial intelligence system that includes a deep-learning network.

6. The system of claim 1, wherein the detected object comprises lumber, wood, metal, plastic, ceramic, composite or any combination thereof.

7. The system of claim 1, wherein the processor further generates and displays one or more summary images to a user comprising the detected objects, measurements, bounding-box information, the count and the volume of the objects, wherein the summary is stored on a local storage of the system, in an inventory control system.

8. The system of claim 1, wherein the processor further generates one or more summary images of information comprising the detected objects, measurements, bounding-box information, the count and the volume of the objects, wherein the information and the summary are uploaded to a server to an inventory control system.

9. The system of claim 8, wherein the inventory control system comprises Sierra Stock Lumber Management application.

10. The system of claim 1, wherein the mobile device comprises a smart phone, handheld computer terminal, or a tablet computer.

11. The system of claim 1, wherein the system operates independent of a physical reference object placed on or near the stacked and bundled objects the images of which are being captured by camera.

12. The system of claim 1, wherein the neural networks comprise a Faster Regional Convolutional Neural Network (Faster RCNN), a deep neural network, or a combination of two or more of the neural networks.

13. A method for counting and measuring of stacked and bundled three-dimensional objects, the method comprising:
- capturing, by a camera of a mobile device, an image of a frontal plane of the stacked objects with their respective widths exposed and in view of the camera;
- automatically, using neural networks for object detection, applying a plurality of bounding-boxes to the captured image, wherein each of the bounding-boxes represents one or more detected objects;
- calculating, based on a number of pixels of each detected object and a pixel relationship with respect to an actual unit ratio, dimensions of each of detected object in imperial or metric units; and
- counting the number of detected objects, and computing the total volume of each detected object based at least in part on a total number of counted detected objects and their respective calculated dimensions.

14. The method of claim 13, wherein the method is performed independent of a physical reference object placed on or near the stacked and bundled objects the images of which are being captured by camera.

15. The method of claim 13, wherein the neural networks comprise a Faster Regional Convolutional Neural Network (Faster RCNN), a deep neural network, or a combination of two or more of the neural networks.

16. A Non-transitory computer readable medium having stored thereon a program to be used by a mobile device for counting and measuring of stacked and bundled three-dimensional objects, the program comprising:
- computer code for capturing an image of a frontal plane of stacked objects with their respective widths exposed and in view of a camera of a mobile device;
- computer code for automatically, using neural networks for object detection, applying a plurality of bounding-boxes to the captured image, wherein each of the bounding-boxes represents one or more detected objects;
- computer code for calculating, based at least in part on a number of pixels of the detected object and a pixel relationship with respect to an actual unit ratio, dimensions of each of the detected objects in imperial or metric units; and
- computer code for counting a number of detected objects, and computing a total volume based at least in part on a total number of counted detected objects and their respective calculated dimensions.

17. The computer implemented method of claim 16, wherein the neural networks comprise a Faster Regional Convolutional Neural Network (Faster RCNN), a deep neural network, or a combination of two or more of the neural networks.

* * * * *